(12) United States Patent
Pedersen

(10) Patent No.: US 8,262,533 B2
(45) Date of Patent: Sep. 11, 2012

(54) TRANSMISSION

(75) Inventor: Troels Pedersen, Nivá (DK)

(73) Assignee: Tomatech A/S, Lyngby (DK)

( * ) Notice: Subject to any disclaimer, the term of this patent is extended or adjusted under 35 U.S.C. 154(b) by 447 days.

(21) Appl. No.: 12/226,817

(22) PCT Filed: Apr. 30, 2007

(86) PCT No.: PCT/DK2007/000209
§ 371 (c)(1),
(2), (4) Date: Jan. 9, 2009

(87) PCT Pub. No.: WO2007/124753
PCT Pub. Date: Nov. 8, 2007

(65) Prior Publication Data
US 2010/0227732 A1    Sep. 9, 2010

(30) Foreign Application Priority Data

Apr. 30, 2006    (DK) .................................. 2006 00609

(51) Int. Cl.
*F16H 3/44* (2006.01)
(52) U.S. Cl. ........................................................ 475/290
(58) Field of Classification Search .................. None
See application file for complete search history.

(56) References Cited

U.S. PATENT DOCUMENTS

| | | | | |
|---|---|---|---|---|
| 707,672 | A | * | 8/1902 | Baker ........................... 475/290 |
| 1,632,123 | A | | 6/1927 | Else |
| 1,808,539 | A | * | 6/1931 | Gessner ........................ 475/290 |
| 1,986,045 | A | | 1/1935 | Clayton |
| 3,596,538 | A | | 8/1971 | Braun |
| 3,686,978 | A | | 8/1972 | Knoblach et al. |
| 4,181,041 | A | | 1/1980 | Frost |
| 4,214,489 | A | | 7/1980 | Ahlen et al. |
| 4,621,541 | A | | 11/1986 | Takahashi |
| 5,472,382 | A | | 12/1995 | Aramendia |
| 5,577,976 | A | | 11/1996 | Haka |
| 5,865,703 | A | * | 2/1999 | Shiokawa et al. ............. 475/269 |

(Continued)

FOREIGN PATENT DOCUMENTS

DE    39 03 517    10/1989

(Continued)

OTHER PUBLICATIONS

U.S Appl. No. 11/887,575, filed Feb. 4, 2009.

(Continued)

*Primary Examiner* — Dirk Wright
(74) *Attorney, Agent, or Firm* — Harness, Dickey & Pierce, P.L.C.

(57) ABSTRACT

The invention provides a transmission providing a gear ratio between an input shaft and an output shaft. The transmission comprises an annulus ring, a sun wheel being rotatable around a central axis of the transmission, a planet carrier being rotatable around the central axis of the transmission, and a set of planet wheels, each wheel comprising a plurality of wheel segments with different diameters, the planet wheels being fixed in rotational bearings of the planet carrier and being arranged to rotate epicyclically around the central axis. The annulus ring and the sun wheel each interacts with one of the wheel segments e.g. via meshing toothed gear wheels. The gear facilitates various interaction means at different locations in the gear, and thus facilitates a potentially less noisy, lighter, smaller or stronger gear by use of a low amount of components.

11 Claims, 15 Drawing Sheets

U.S. PATENT DOCUMENTS

| | | | |
|---|---|---|---|
| 5,957,801 | A | 9/1999 | Barnes, II |
| 5,957,804 | A | 9/1999 | Schulz et al. |
| 5,967,934 | A | 10/1999 | Ishida et al. |
| 6,485,390 | B2 | 11/2002 | Inoue |
| 6,796,921 | B1 | 9/2004 | Buck et al. |
| 7,662,061 | B2 * | 2/2010 | Nagao ............ 475/290 |
| 2004/0211576 | A1 | 10/2004 | Milbourne et al. |
| 2005/0215385 | A1 | 9/2005 | Spielmann et al. |
| 2007/0023196 | A1 | 2/2007 | Hara et al. |

FOREIGN PATENT DOCUMENTS

| | | |
|---|---|---|
| DE | 101 61 942 | 7/2003 |
| EP | 0 613 758 | 3/1994 |
| EP | 0 846 888 | 6/1998 |
| EP | 1 262 683 | 12/2002 |
| EP | 1 326 032 | 7/2003 |
| EP | 2095909 | 9/2009 |
| FR | 2 669 983 | 6/1992 |
| GB | 105 815 | 6/1982 |
| GB | 2 102 532 | 7/1982 |
| GB | 2 197 700 | 8/1987 |
| GB | 2 335 011 | 9/1999 |
| JP | 45-5299 | 3/1970 |
| JP | 62-242163 | 10/1987 |
| JP | 2000-74214 | 3/2000 |
| JP | 2003-130146 | 5/2003 |
| JP | 2005-351336 | 12/2005 |
| WO | WO 2009/027821 | 3/2009 |
| WO | WO 2010034563 | 4/2010 |

OTHER PUBLICATIONS

International Search Report dated Sep. 6, 2011 for International Application No. PCT/EP2011/056844.

U.S. Office Action dated Jan. 24, 2012, issued in Co-Pending U.S Appl. No. 11/887,575.

Yeaple, Frank, "Planetary gears take on new jobs", Product Engineering, vol. 50. No. 5, pp. 37-41 (May 1979).

* cited by examiner

TRANSMISSION

INTRODUCTION

The present invention relates to a transmission providing a gear ratio between an input shaft and an output shaft. The transmission comprises an annulus ring, a sun wheel being rotatable around a central axis of the transmission, a planet carrier being rotatable around the central axis of the transmission, and a set of planet wheels. The planet wheels are fixed in rotational bearings of the planet carrier and they are arranged to rotate epicyclically around the central axis. Such transmissions are sometimes referred to as epicyclic gears or planet gears.

BACKGROUND OF THE INVENTION

A transmission or gearbox is a system which transmits mechanical power from a prime mover, e.g. an engine or electric motor, to some form of output device. Typically, the rotational speed of an input shaft is changed, resulting in a different output speed. However, some transmissions merely change the physical direction in which power is transmitted.

Planet gear systems comprise one or more planet gears rotating about a centrally located sun gear. Sometimes, the planet gears are mounted on a movable carrier. The carrier may either be fixed relative to the housing, or it may rotate relative to the housing and/or relative to the sun gear. The transmission may further incorporate an cuter ring gear with radially inwardly projecting gear teeth, generally referred to as the annulus.

In traditional planet gears, the ability to shift between different gear ratios may require a complicated wheel configuration.

DESCRIPTION OF THE INVENTION

It is an object of embodiments of the invention to improve transmissions, in particular transmissions for power tools and vehicles. Accordingly, the invention, in a first aspect, provides a transmission wherein each planet wheel comprises a plurality of different wheel segments, wherein the annulus ring and the sun wheel each interacts with one of the wheel segments.

By interact is meant that the wheel segments and sun wheel influence each other by any kind of drive mechanism, e.g. by tooth gearing, surface friction, traction, magnetism etc so that torque can be transferred between the interacting parts. By gear ratio is meant the ratio between a rotational speed of the input shaft and rotational speed of the output shaft. The ratio could be anything including 1:1.

Since the planet wheel comprises several wheel segments, the interaction between the planet wheel and the sun wheel can be different from the interaction between the planet wheel and an annulus ring and the interaction may therefore be designed under consideration of specific characteristics relating to the use of the transmission, e.g. requirements for noise reduction, strength, flexibility etc. The transmission may facilitate a large gear ratio by use of a low amount of interacting components compared to traditional transmissions. Due to the potentially large gear ratio, a very compact gear can be provided.

As an example, the planet wheel may interact with the sun wheel and with the annulus ring by use of completely different interaction principles. With the sun wheel, one of the wheel segments may interact via meshing gear teeth and with the annulus ring, another wheel segment may interact via traction, magnetism etc.

As another example, the planet wheel may interact both with the sun wheel and with the annulus ring via meshing gear teeth, where the teeth meshing with the sun gear are different from the teeth meshing with the annulus gear. One set of teeth could be adapted to transfer more torque than the other, or one set of teeth could be adapted to provide a more silent transfer of torque than the other, or one set of teeth could be adapted to absorb peak loads better than the other set of teeth and so forth. Accordingly, the geometry of one set of teeth could be different from the geometry of another set of teeth, or two sets of teeth could be made from different materials.

Accordingly, the wheel segments of one planet wheel may differ in diameters, in the interaction types which they are suitable for, and in the material from which they are made.

The wheel segment of one planet wheel may, in one embodiment, be locked relative to each other so that they rotate with the same rotational speed (rounds per minute). In one embodiment, they are simply formed in one single component, e.g. by molding or sintering a wheel with sections having different diameters, or with sections having different gear teeth, or with sections having different surface characteristics, e.g. different surface frictions etc.

In one embodiment, one of the wheel segments is arranged to interact both with the annulus ring and with the sun wheel. In this embodiment, the transmission may contain further annulus rings or sun wheels interacting with other wheel segments, or the other wheel segments may be unused and ready for refitting of the transmission with an annulus ring or sun wheel adapted for a different interaction principle, geometry or size.

The input shaft may rotate with the sun wheel or with the planet carrier, and the output shaft may rotate with the other one of the sun wheel and the planet carrier. By "rotate with" is meant that the input shaft rotates with the same rotational speed as the sun wheel or planet carrier, and the output shaft rotates with the same rotational speed as the other one of the sun wheel or planet carrier. The input shaft may simply form part of, or be solidly connected to the sun wheel or to the planet carrier whereas the output shaft forms part of, or is solidly connected to the other one of the sun wheel and planet carrier.

The annulus ring could be at least partially locked relative to a reference system. The reference system could form part of a chassis of a car or a power tool, or in general constitute a part which is fixed relative to a housing of the transmission, or the reference system could be constituted by a housing of the transmission. As an example, the annulus ring may be connected to a reference system via a coupling which offers a variable resistance against rotation of the annulus ring relative to that reference system, or which completely prevent relative rotation. In that way, the gear ratio can be changed by locking, partly locking or unlocking of the relative rotation, or torque transfer may completely be prevented. The coupling may thus be used e.g. in connection with a power tool such as a power drill where protection of a slot in a screw may be desired by preventing transfer of torque over a limit value. This kind of torque limitation, sometimes referred to as retched, can, according to the second aspect of the invention, be provided by connecting at least one of the annulus rings to a reference system via a coupling which releases and thus allows rotation of the annulus ring relative to the reference system when reaching a certain torque there between.

To enable shifting between a gear ratio which is determined by the interaction between the planet wheel, the sun wheel and the annulus ring and a ratio of 1:1, the transmission may have a configuration switching means enabling a user to shift between two configurations. In a first configuration, the input shaft rotates with one of the sun wheel and planet carrier, and the output shaft rotates with the other one of the sun wheel and the planet carrier, and the sun wheel interacts with one of the wheel segments. In a second configuration, the input shaft rotates with the output shaft, e.g. by connecting the input shaft and output shaft directly to each other.

The transmission may, as an optional way of shifting between different gear ratios, further comprise at least one additional annulus ring and selection means for selecting an at least partially locking of one of the annulus rings relative to a reference system. The annuls rings of the transmission may be of different radial size, be adapted for different interaction principles, e.g. gear teeth interaction, traction, magnetism etc, they may have different pitch circle diameters, different numbers of teeth, or they may be made of different materials.

In one embodiment, each annulus ring forms a gear wheel with an internal toothing, the wheel segments form gear wheels with outer toothing and with different pitch circle diameters, and the sun wheel forms a gear wheel with outer toothing.

In a second aspect, the invention provides a transmission providing a gear ratio between an input shaft and an output shaft, the system comprising:
 a first annulus ring,
 a second annulus ring,
 a first sun wheel being rotatable around a central axis of the transmission,
 a planet carrier being rotatable around the central axis of the transmission, and
 a set of planet wheels, each wheel comprising a plurality of different wheel segments, the planet wheels are attached to the planet carrier via rotational bearings and they are arranged to rotate epicyclically around the central axis,
one of the wheel segments being arranged to interact with the first annulus ring, another wheel segment being arranged to interact with the second annulus ring, and one of the wheel segments being arranged to interact with the sun wheel. The transmission may comprise annulus ring selection means allowing selection of, at least partially locking of one of the first and second annulus rings relative to a reference system.

Accordingly, the wheel segments of one planet wheel may differ in diameters, in the interaction types which they are suitable for, and in the material from which they are made.

The annulus ring selection means provides a simple means of shifting between various gear ratios. The transmission may further facilitate a larger tear ratio in a lowest one of the various gear ratios and makes it possible to shift to a gear with a smaller ratio by use of only one single additional component, namely the annulus selection means.

In addition, the transmission according to the second aspect may advantageously be applied in applications wherein torque release is desired to protect a surrounding object—e.g. in connection with a power tool such as a power drill where protection of a slot in a screw may be desired by preventing transfer of torque over a limit value. This kind of torque limitation can, according to the second aspect of the invention, be provided by connecting at least one of the annulus rings to a reference system via a coupling which releases and thus allows rotation of the annulus ring relative to the reference system when reaching a certain torque there between. A coupling of this kind could be applied between the reference system and each of the annulus rings individually, and the couplings could be adapted to release at different limit torques.

The transmission may comprise a second sun wheel being rotatable around a central axis of the transmission. The transmission may comprise sun wheel selection means for establishing interaction selectively between one of the sun wheels and one of the wheel segments.

In accordance with the first aspect of the invention, the input shaft may rotate with the sun wheel or planet carrier, and the output shaft may rotate with the other one of the sun wheel and the planet carrier.

The transmission may further comprise configuration switching means allowing a user to switch between a first configuration and a second configuration. In the first configuration, the input shaft rotates with one of the sun wheel and planet carrier, and the output shaft rotates with the other one of the sun wheel and the planet carrier, and the sun wheel interacts with one of the wheel segments. In the second configuration, the input shaft rotates with the output shaft.

The wheel segments may interact with the sun wheel and with that annulus ring which is at least partially locked.

In one embodiment, each annulus ring forms a gear wheel with an internal toothing, the wheel segments form gear wheels with outer toothing and with different pitch circle diameters, and each sun wheel forms a gear wheel with outer toothing.

In a third aspect, the invention provides a transmission providing a gear ratio between an input shaft and an output shaft, the transmission comprising:
 at least one annulus ring,
 a first sun wheel being rotatable around a central axis of the transmission,
 a second sun wheel being rotatable around a central axis of the transmission
 a planet carrier being rotatable around the central axis of the transmission, and
 a set of planet wheels, each wheel comprising a plurality of different wheel segments, the planet wheels are attached to the planet carrier via rotational bearings and they are arranged to rotate epicyclically around the central axis,
one of the wheel segments being arranged to interact with an annulus ring, the transmission comprising selection means for establishing interaction selectively between one or the other of the sun wheels and one of the wheel segments.

Accordingly, the wheel segments of one planet wheel may differ in diameters, in the interaction types which they are suitable for, and in the material from which they are made.

The selection means provides a simple way of changing the gear ratio.

The sun wheels may interact constantly with different wheel segments, and shifting between different ratios may be obtained by selectively providing input on one of the sun wheels and output on the planet carrier, vice versa.

By locking at least partly one of the sun wheels to a reference system while the annulus rings are allowed to rotate freely under influence of interaction with the wheel segments, the rotation direction of the output shaft relative to the input shaft may be changed. This may advantageously be applied in vehicles or tools for reversing a drive direction.

Likewise the first and second aspects of the invention, the input shaft may rotate with one of the sun wheel and planet carrier, and the output shaft rotates with the other one of the sun wheel and the planet carrier. The system may also comprise a second annulus ring being arranged to interact with one of the wheel segments, and at least one of the annulus rings may be at least partially locked relative to a reference system. The transmission may further comprise configuration switching means for selectively establishing a first configuration or a second configuration. In the first configuration, the input shaft rotates with one of the sun wheel and planet carrier, the output shaft rotates with the other one of the sun wheel and the planet carrier, and the sun wheel interacts with one of the wheel segments. In the second configuration, the input shaft rotates with the output shaft.

Each annulus ring forms a gear wheel with an internal toothing, the wheel segments form gear wheels with outer toothing and with different pitch circle diameters, and each sun wheel forms a gear wheel with outer toothing.

The mentioned transmissions, i.e. the transmission according to the first, second and third aspects, could be used in power tool and vehicles.

In a fourth aspect, the invention provides a power tool such as a power screw driver incorporating such a transmission, and in a fifth aspect, the invention provides a vehicle using a transmission according to the first, second and third aspects, in particular a transmission located in a wheel hub. Used in a power tool, the transmission may in particular be provided to release locking between the annulus ring and a reference system, e.g. the chassis of a power drill or screwdriver, when a reference torque between the annulus ring and the reference system is exceed.

In a sixth aspect, the invention provides a method of driving a tool by use of a motor which transfers torque to the tool via a transmission comprising:
 a first annulus ring,
 a second annulus ring,
 a first sun wheel being rotatable around a central axis of the transmission,
 a planet carrier being rotatable around the central axis of the transmission, and
 a set of planet wheels, each wheel comprising a plurality of different wheel segments, the planet wheels are attached to the planet carrier via rotational bearings and they are arranged to rotate epicyclically around the central axis.

The wheel segments of one planet wheel may differ in diameters, in the interaction types which they are suitable for, and in the material from which they are made.

One of the wheel segments is arranged to interact with the first annulus ring, another wheel segment is arranged to interact with the second annul's; ring, and one of the wheel segments is arranged to interact with the sun wheel. The transmission further comprises annulus ring selection means for selectively at least partially locking one of the first and second annulus rings relative to a reference system.

The method comprises the step of changing the ratio between a speed by which the tool is moved and a rotational speed of the motor by use of the selection means.

In a seventh aspect, the invention provides a method of driving a tool by use of a motor which transfers torque to the tool via a transmission comprising:
 at least one annulus ring,
 a first sun wheel being rotatable around a central axis of the transmission,
 a second sun wheel being rotatable around a central axis of the transmission
 a planet carrier being rotatable around the central axis of the transmission, and
 a set of planet wheels, each wheel comprising a plurality of different wheel segments, the planet wheels are attached to the planet carrier via rotational bearings and they are arranged to rotate epicyclically around the central axis, one of the wheel segments being arranged to interact with an annulus ring. The transmission comprising selection means for establishing interaction selectively between one or the other of the sun wheels and one of the wheel segments. The wheel segments of one planet wheel may differ in diameters, in the interaction types which they are suitable for, and in the material from which they are made.

The method comprises changing the ratio between a speed by which the tool is moved and a rotational speed of the motor by use of the selection means.

The method may further comprise the step of at least partially locking one of the sun wheels to a reference system and allowing each annulus ring to rotate with a corresponding wheel segment. By providing input via one of either the unlocked sun wheel and the planet carrier and output on the other one of the unlocked sun wheel and the planet carrier, the last mentioned step of locking one of the sun wheels enables shifting of direction of the input relative to the output. In a vehicle, the locking of one of the sun wheels thus enables shifting of drive direction. In a power tool such as a screw driver, the locking of one of the sun wheels enables selection between right and left turning of the tool (screwing and unscrewing).

The details mentioned relative to the first, second and third aspects of the invention may also be used in the fourth, fifth and sixth aspect of the invention.

DETAILED DESCRIPTION OF PREFERRED EMBODIMENTS

Figure 1:
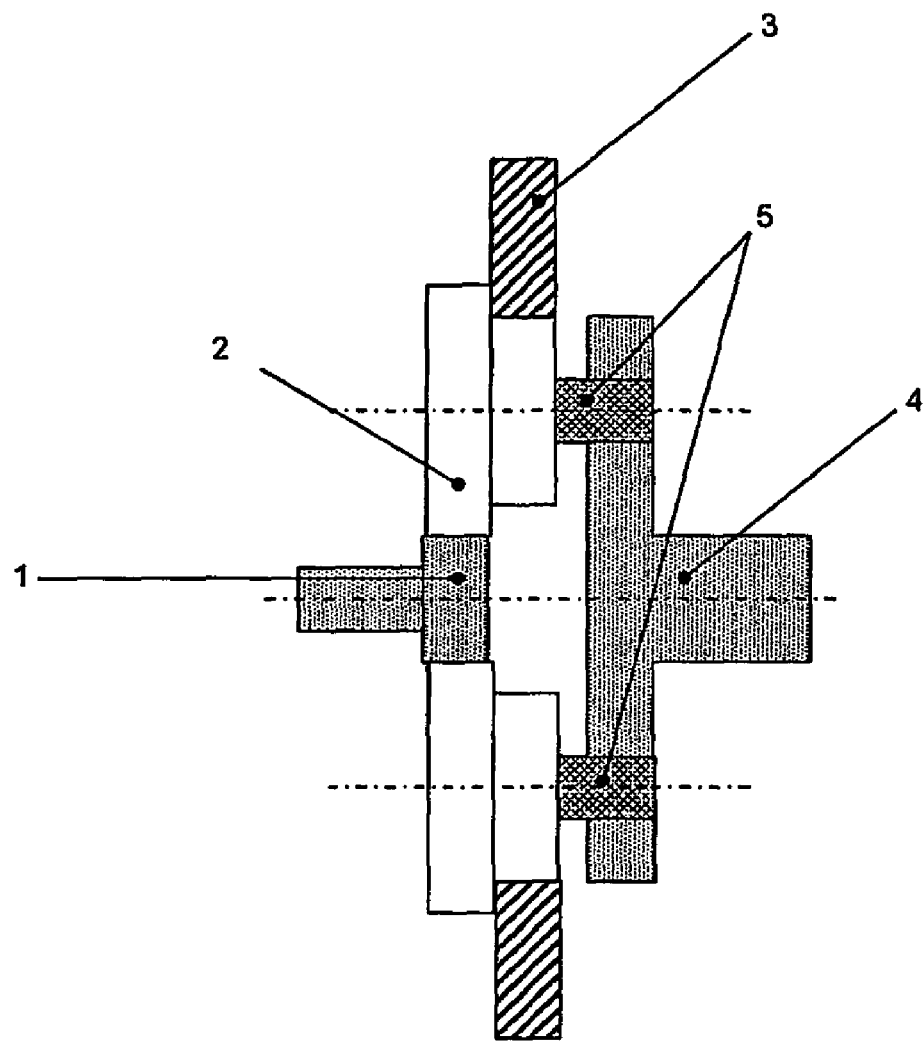
FIGS. 1-3 illustrate different embodiments of the invention.

FIG. 1 shows a simple embodiment where the sun wheel 1 interacts with one wheel segment of a certain diameter on the planet wheel 2. The other wheel segment on the planet wheel interacts with the annulus ring 3. The annulus ring may be locked or partially locked to the reference system. The planet wheels may be fixated to the planet carrier 4 with rotational bearings 5. The interaction between the sun wheel 1 and the planet wheel 2 may be by meshing tooth gearing, friction, traction, magnetism etc. The interaction between the planet wheel 2 and the annulus ring 3 may be by toothed meshing, friction, traction, magnetism etc—independently of other interaction. If all wheels and the annulus ring 1 are provided with gear teeth, power performance can be optimized, noise or friction can be reduced, or the price can be lowered by providing the modulus or type of teeth profile between the meshing of the sun wheel/planet wheels different from the meshing of planet wheels/annulus ring.

Figure 2:
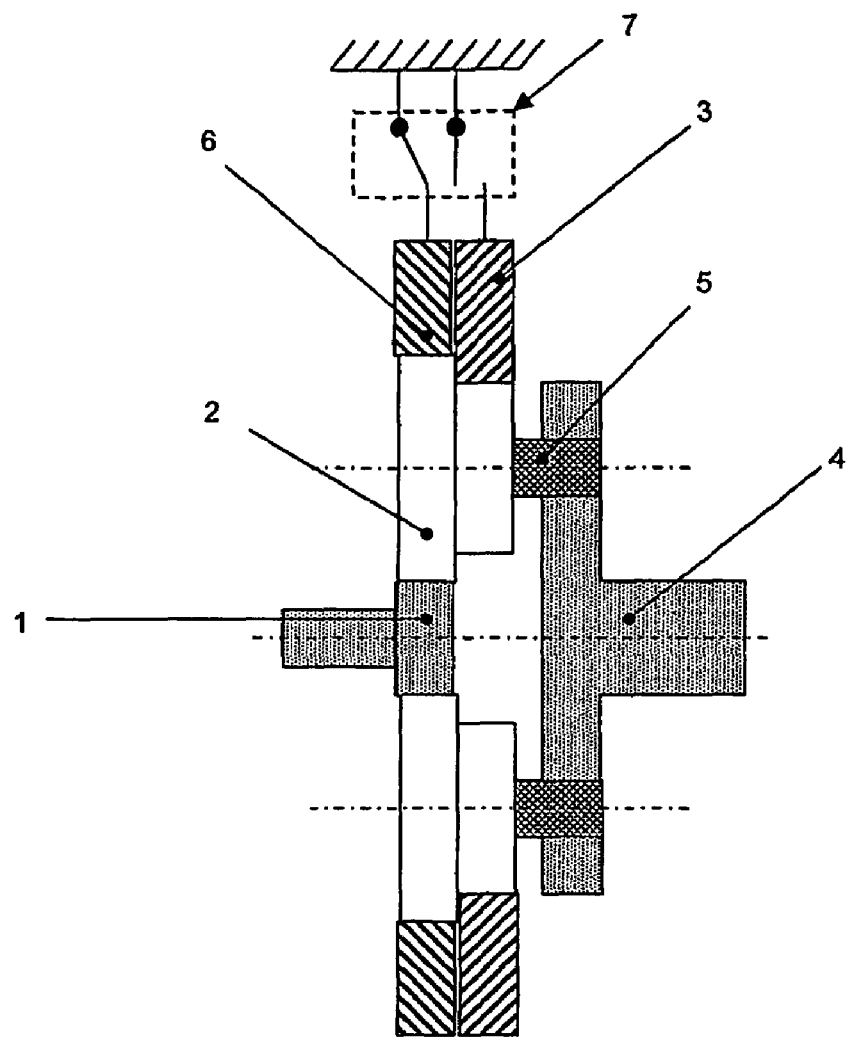

FIG. 2 shows another embodiment where two annulus rings—annulus ring one 3 and annulus ring two 6—are interacting with at least one planet wheel 2 having two segments of different diameters. Furthermore, one sun wheel 1 is interactive with one of the wheel segments on the planet wheels 3. The planet wheels 3 are fixed with rotation bearings 5 to a planet carrier 4. The annulus rings 3 and 6 may be locked or partially locked to a reference system by selection means forming a shifting arrangement 7. The locking may be done in a way where both annulus rings are locked simultaneously followed by a release of one of the rings to make the gear work. In this way the shifting may allow both annulus rings to be locked to the reference system forming a kind of parking brake to prevent the output from rotating when the input is not able to make a sufficient holding torque (power off). This is of particular interest for power tools where it is desired to lock the output e.g. during change of tools.

Another way of locking the annulus rings is to release both annulus rings so they can rotate freely—followed by a locking of one of the annulus rings to the reference system. This enables the system to be freewheeling, which could be very helpful if one prefers to brake output rapidly without braking the motor as well (as the energy in the rotor of the motor may exceed that of the output). In another embodiment, the shifting between locking the annulus ring one and annulus ring two may be done in such a way that the shifting may be considered as momentary. The locking of the annulus rings to the reference system may also be done in such a way that the annulus rings are limited in their ability to rotate until certain conditions arise. These conditions may be certain forces or torques acting on the annulus rings say if the torque on the annulus ring locked to the reference system is exceeding a certain level, the annulus ring is released from its fixation to the reference system and may then slide or rotate. This is also known in power tools as a ratchet, preventing overstressing the motor, transmission or cutting tool connected to the output. But this could also be used for locking the transmission until a certain torque is applied on the output or input in order to keep the position of the transmission until the power is up and the input is capable of driving the load on the output. The annulus rings 3 and 6, planet wheels 3 and the sun wheel 1 may be toothed gear wheels meshed with each other. The interaction between all wheels and rings or some wheels and rings may also be based on friction or traction. The power conversion in the interaction may even be based on a microstructure made in the surface of the wheels and the rings. Shifting between which of the two annulus rings that is locked to the reference system may be done in a manual way e.g. by sliding a locking bracket to intersect with either annulus ring one or annulus ring two—preventing the annulus ring from rotating freely. The shifting may also be done in an electronic way e.g. by using magnetic brakes to prevent either one of the annulus rings to rotate freely in order to activate the gear. Further, in one embodiment the shifting is done mechanically and automatically. In one embodiment the sun wheel is connected to input, and the planet carrier is connected to output.

Figure 3:
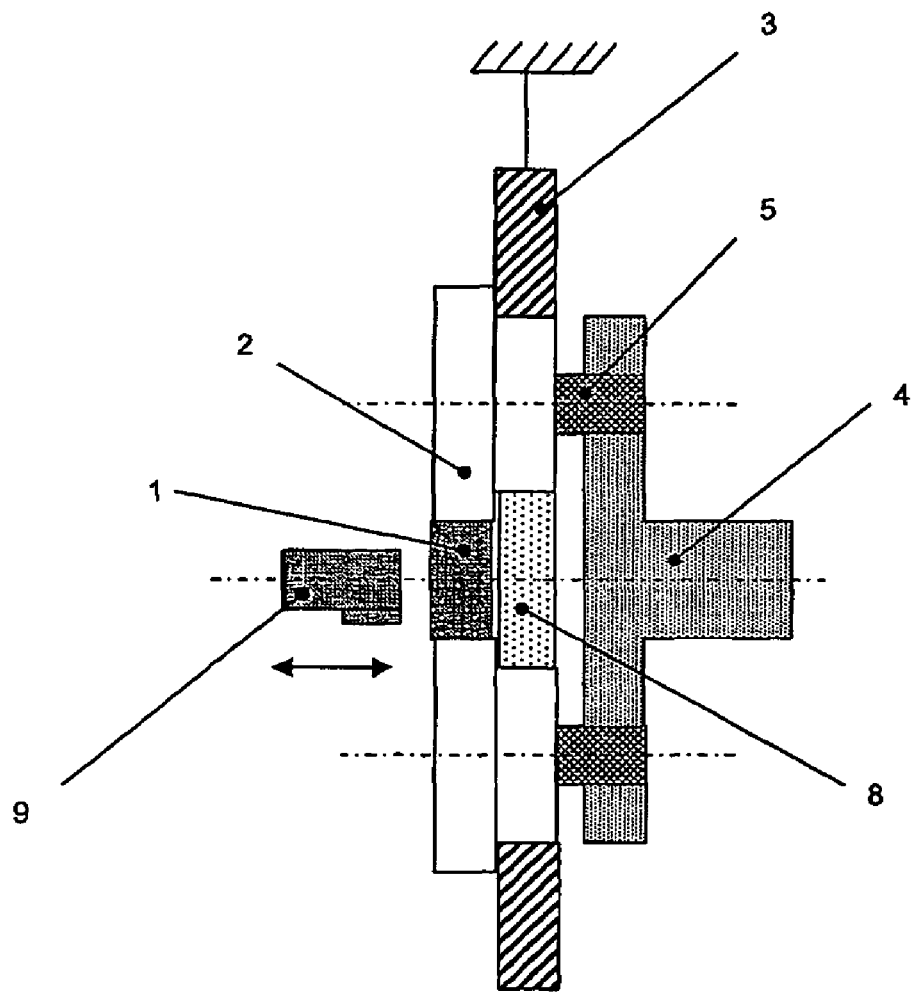

FIG. 3 shows another embodiment with one annulus ring 3, and a plurality of planet wheels 2 with two wheel segments of different diameters. The gear has two sun wheels—sun wheel one 1 and sun wheel two 8. The two sun wheels may be integrated to form one single component with two segments of different diameters. The two sun wheels may in other embodiments form two independent parts. The wheel segments are chosen so that each sun wheel may be allowed to interact with one of the wheel segments on the planet wheel. Depending on which of the sun wheels that is transferring power from the input shaft 9, the transmission may change the gear ratio. The shifting between which of the sun wheels that is transferring the input to the transmission may be done as shown in FIG. 1 by having a locking geometry on the input shaft 9, and then using this geometry to drive either sun wheel one or to move the input shaft so that it engages sun wheel two and drives the transmission through this wheel. The sun wheel which is not driven must then be freewheeling.

Figure 3A:
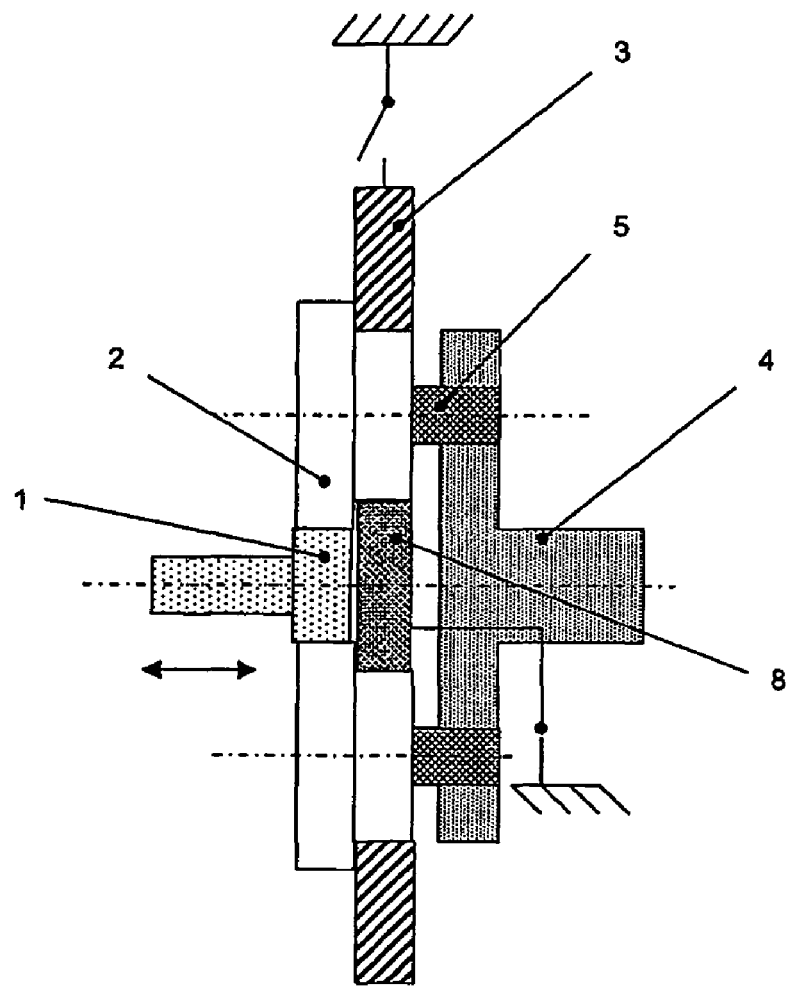

In FIG. 3A another embodiment is shown. Here, the annulus ring 3—in one mode of the gear—may be unlocked from the reference system, as one of the sun wheels 8 is locked to the reference system instead. This will change the direction of rotation for the system. The gear ratio will change as well.

Figure 3B:
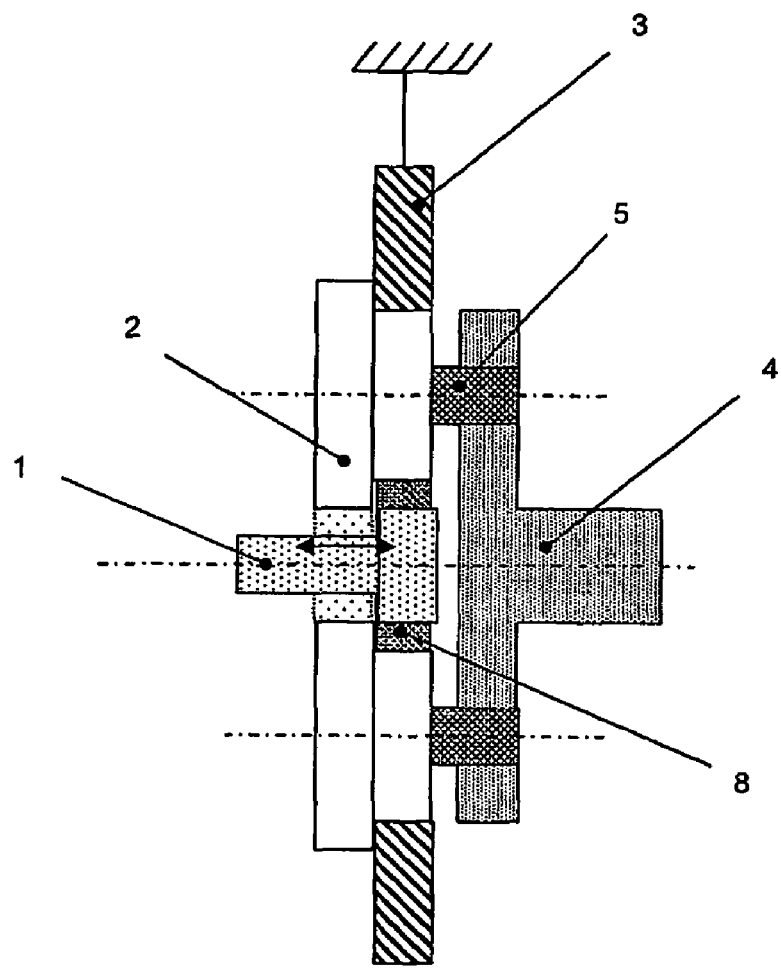

In one embodiment shown in FIG. 3B the smallest sun wheel (sun wheel one) 1 is connected to input. This sun wheel may then drive by interaction with the planet wheels 2, or it may be moved in order to connect with the other sun wheel 8. Power is thereby transmitted through both sun wheels. In this embodiment—the sun wheel two will be freewheeling whenever the sun wheel one is interacting with the planet wheels and power is transmitted. Similar to the embodiment shown in FIG. 1, the wheels may interact with each other via toothed meshing or wheels using friction, traction or magnetic forces.

Figure 4:
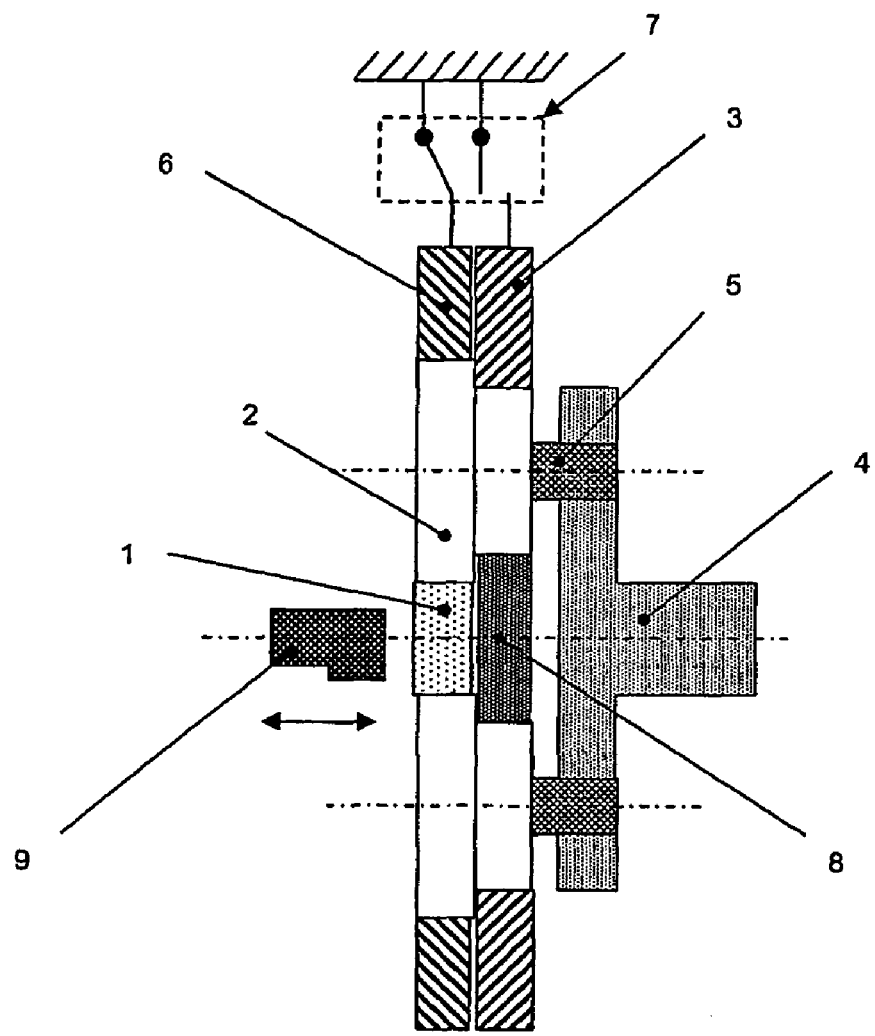
FIGS. 4-6 illustrate transmissions combining the features of the previously illustrated transmissions.

FIG. 4 shows another preferred embodiment where the configurations shown in FIG. 1 and FIG. 2 are combined to form a transmission with many different gear ratios. The transmission may change between which sun wheel 1 and 8 that is connected to the input, and which of the annulus rings 3 and 6 that are locked to the reference system.

Figure 4A:
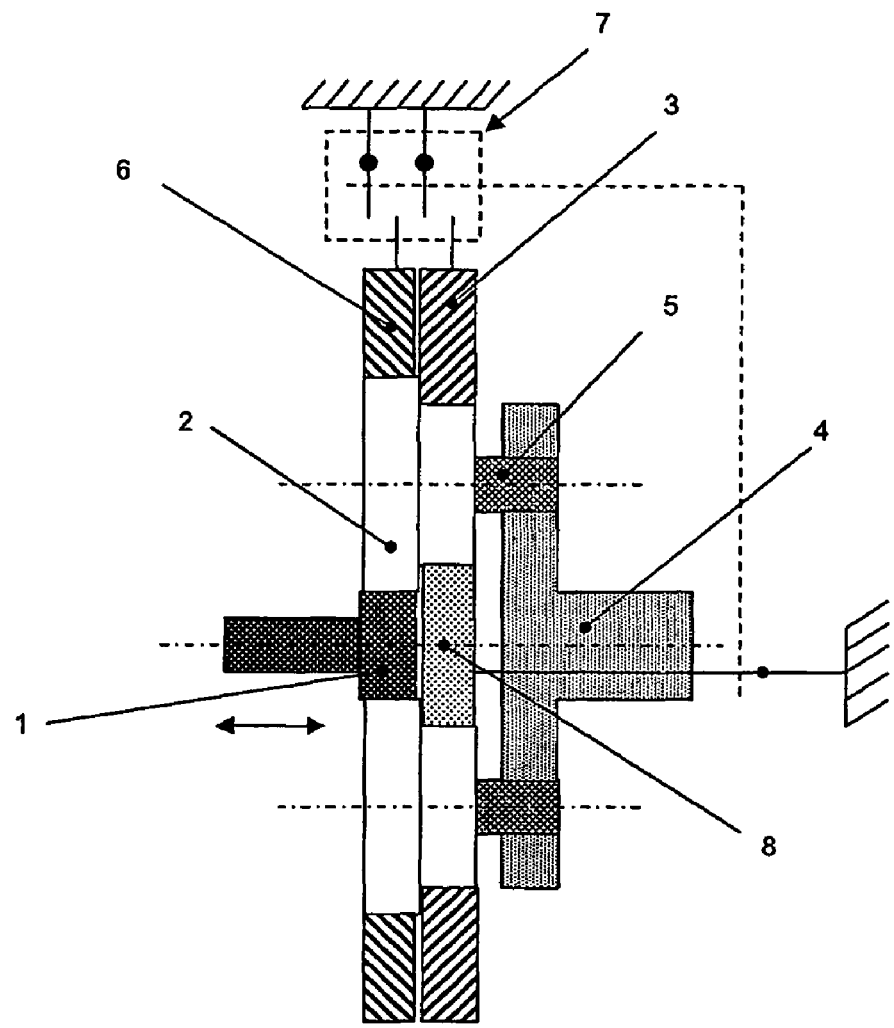
FIG. 4A illustrates a transmission where none of the annulus rings are locked to the reference system.

In FIG. 4A the transmission is in a special mode, where none of the annulus rings 3 and 6 are locked to the reference system, but one of the sun wheels 8 is locked to the reference system as the other sun wheel 1 works as an input. In this special transmission it is possible to make four forward gearings and one reverse. As for the transmission explained in FIG. 1, the embodiment of the transmission may also be totally locked by locking both annulus rings to the reference system or locking one annulus ring and one of the sun wheels to the reference system.

In the following Figs., "A" indicates a Two-step gear, and "B" indicates a short circuit connection. By "Two-step gear" is meant that the gear is configurable into at least two different configurations providing different gear ratio between input and output.

Figure 5:
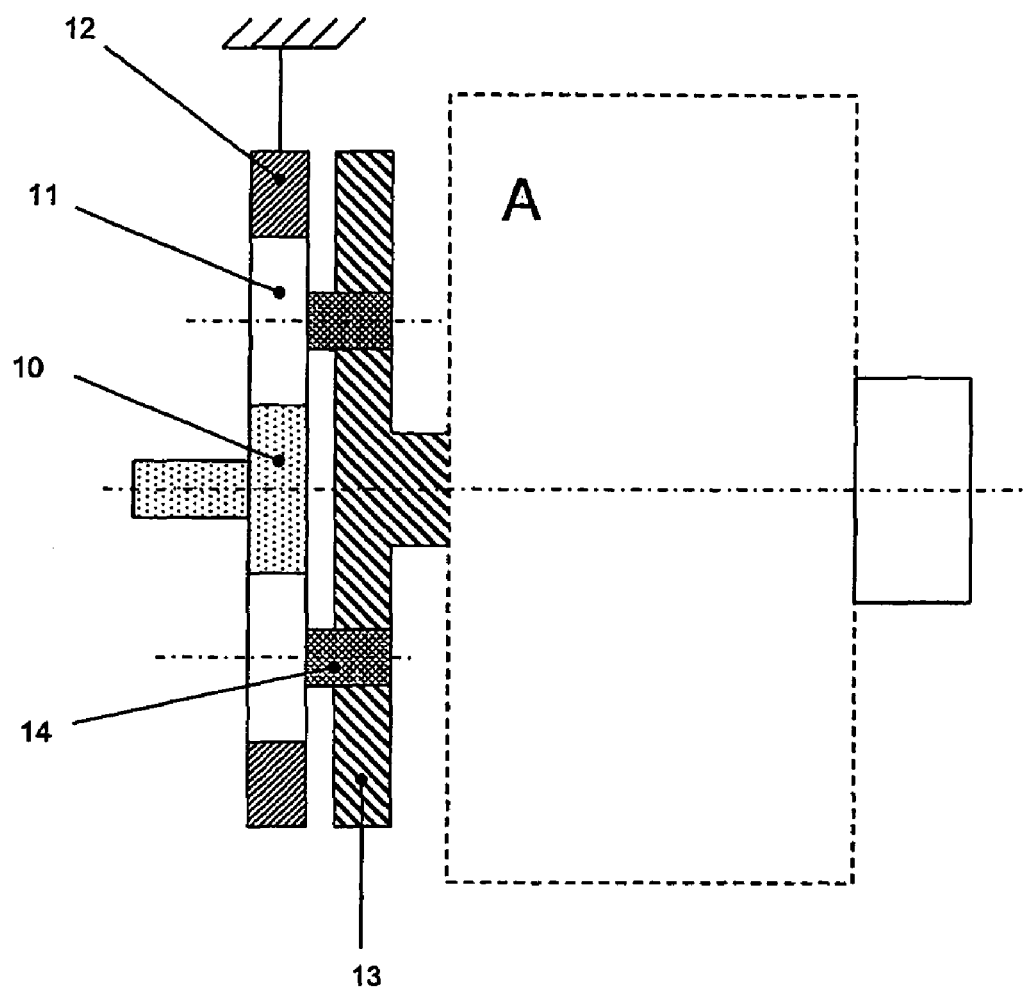
Figure 5A:
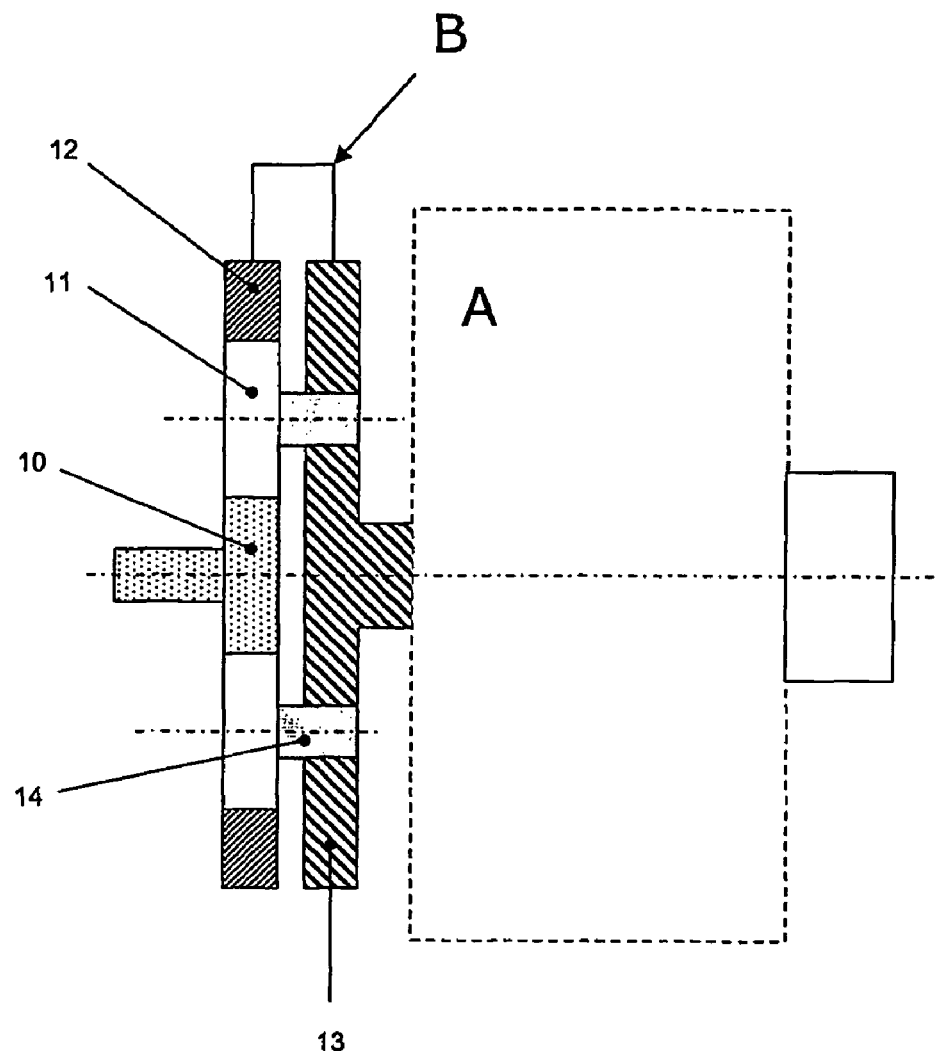

FIG. 5 shows any of the embodiments of FIG. 1 to FIG. 3 combined with a pre-stage transmission, e.g. another planetary transmission consisting of a sun wheel 10, one or more planet wheels 11, a planet carrier 13, an annulus ring 12 and rotational bearings 14. The annulus ring may be totally or partially locked to the reference system. The pre-stage gear has a fixed gear ratio. In one embodiment the pre-stage transmission may be chosen freely to short circuit or not—as another way of making more gear ratios in the total transmission. This short circuit may be done by locking the annulus ring of this pre-stage gear to the carrier instead of the reference system. This is shown in FIG. 5A. In another embodiment this short circuit is simply done by connecting the input shaft or the sun wheel directly to the planet carrier.

Figure 6:
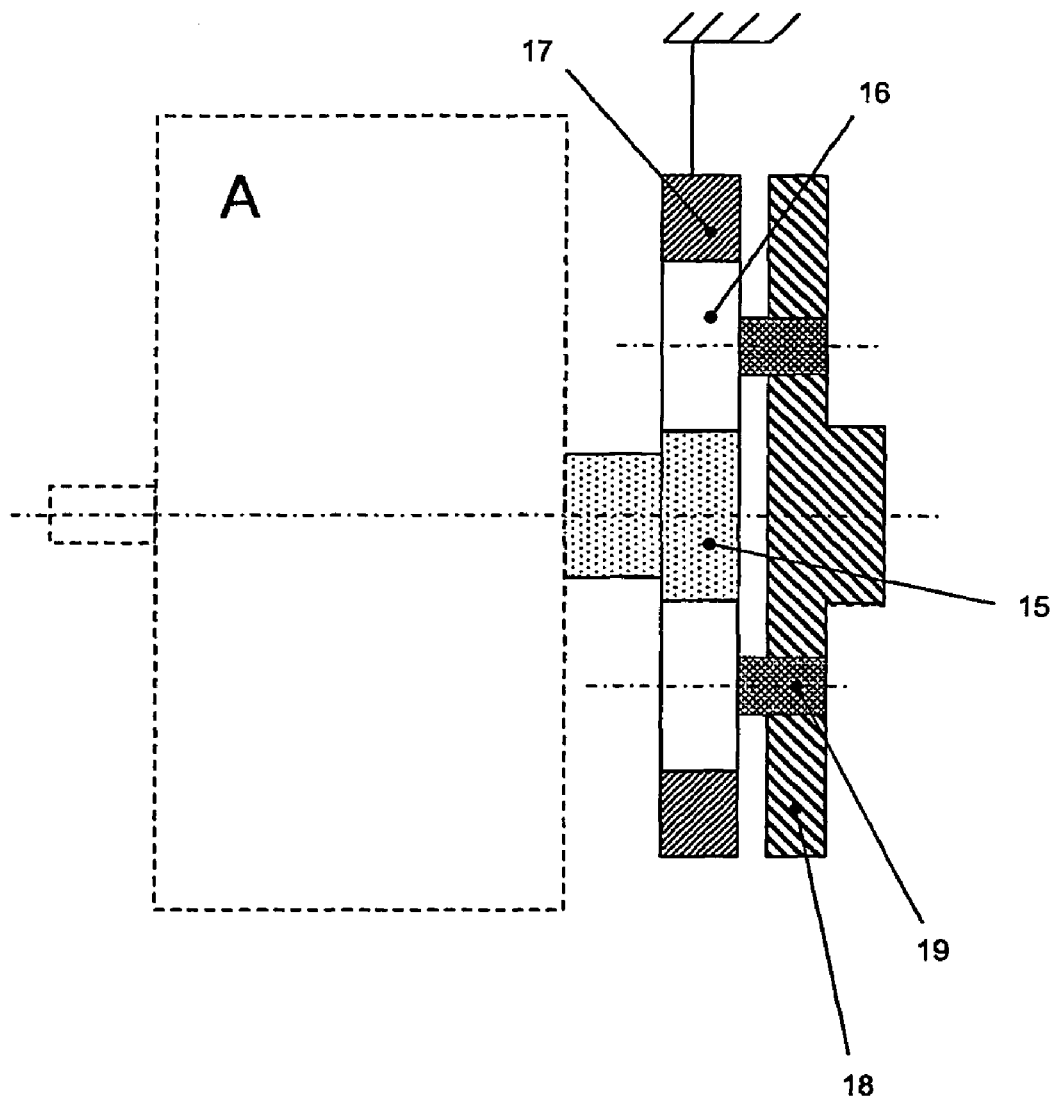
Figure 6A:
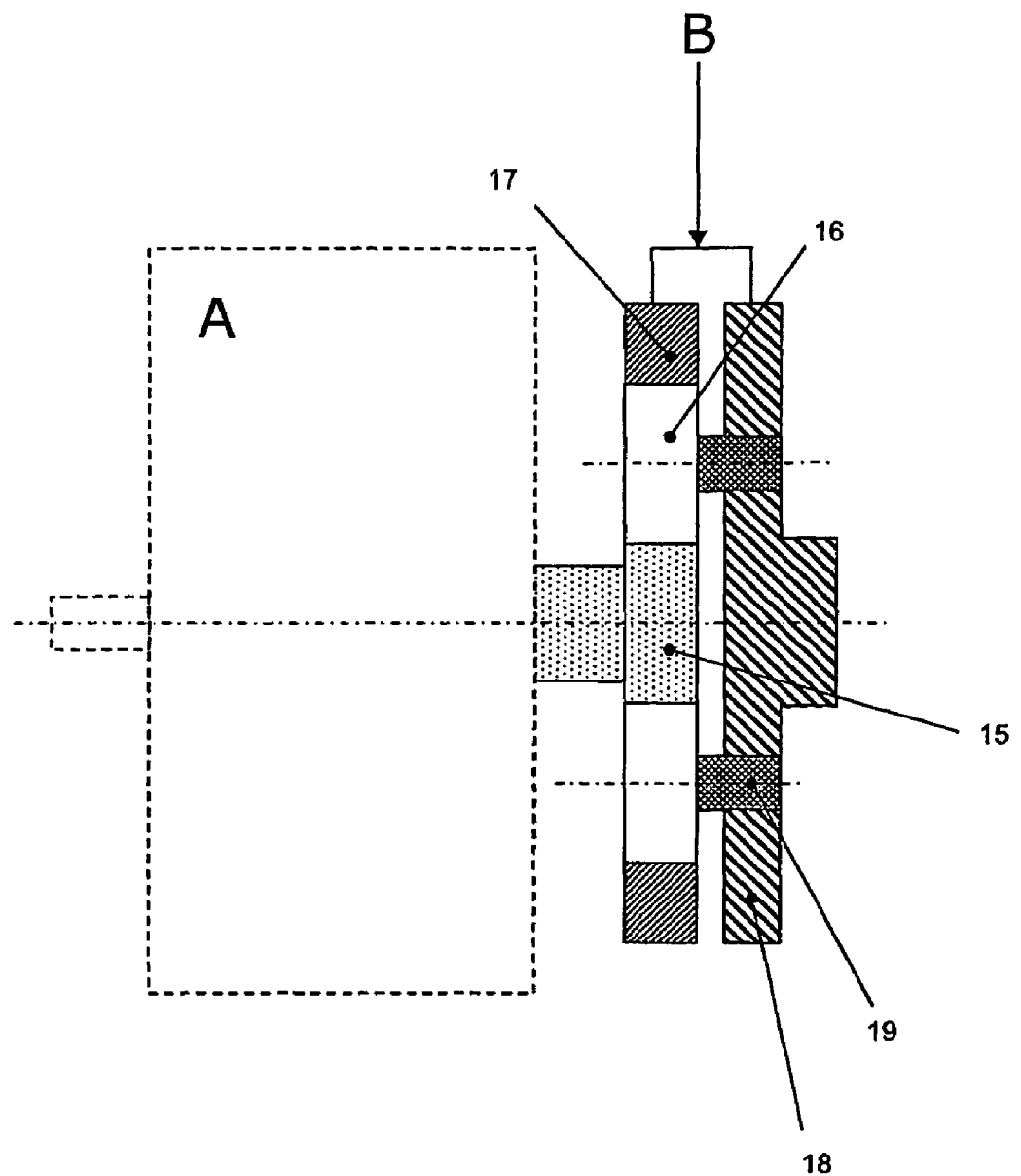
Figure 6B:
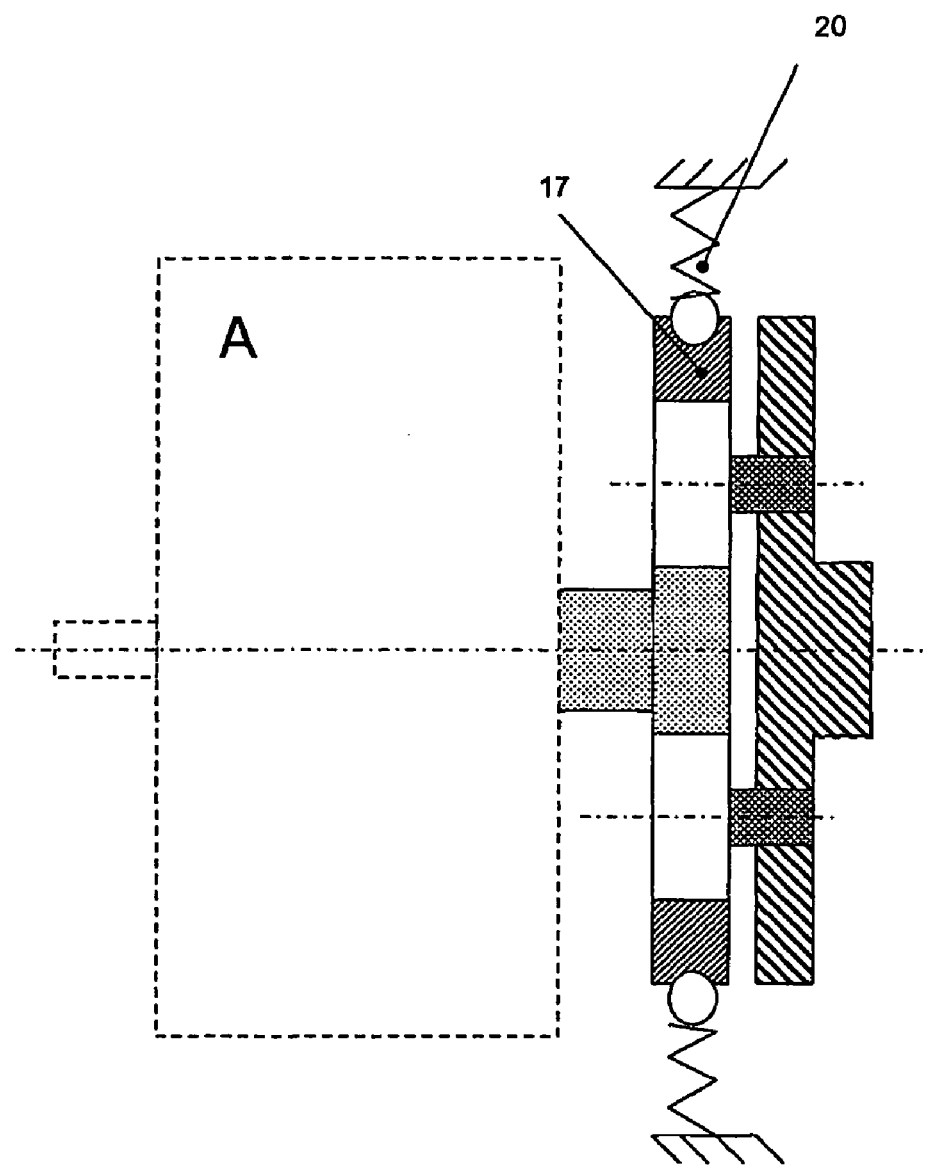

FIG. 6 shows any of the embodiments of FIG. 1 to FIG. 3 combined with a power gear stage. This power stage may be a planetary transmission consisting of a sun wheel 15, one or more planet wheels 16, an annulus ring 17, a planet carrier 18 and rotational bearings 19. The power stage could also be any other kind of power stage transmission. The power stage transmission may be chosen freely to be working or short circuited in order to eliminate the gearing of the power stage. An example of the short circuit is shown in FIG. 6A where the annulus ring of the power stage is connected to the planet carrier instead of the reference system. In one embodiment of this, the annulus ring of the power stage is bound to the reference system through a ratchet 20 to prevent overload of the transmission during handling. In FIG. 6B this special embodiment is shown.

Figure 7:
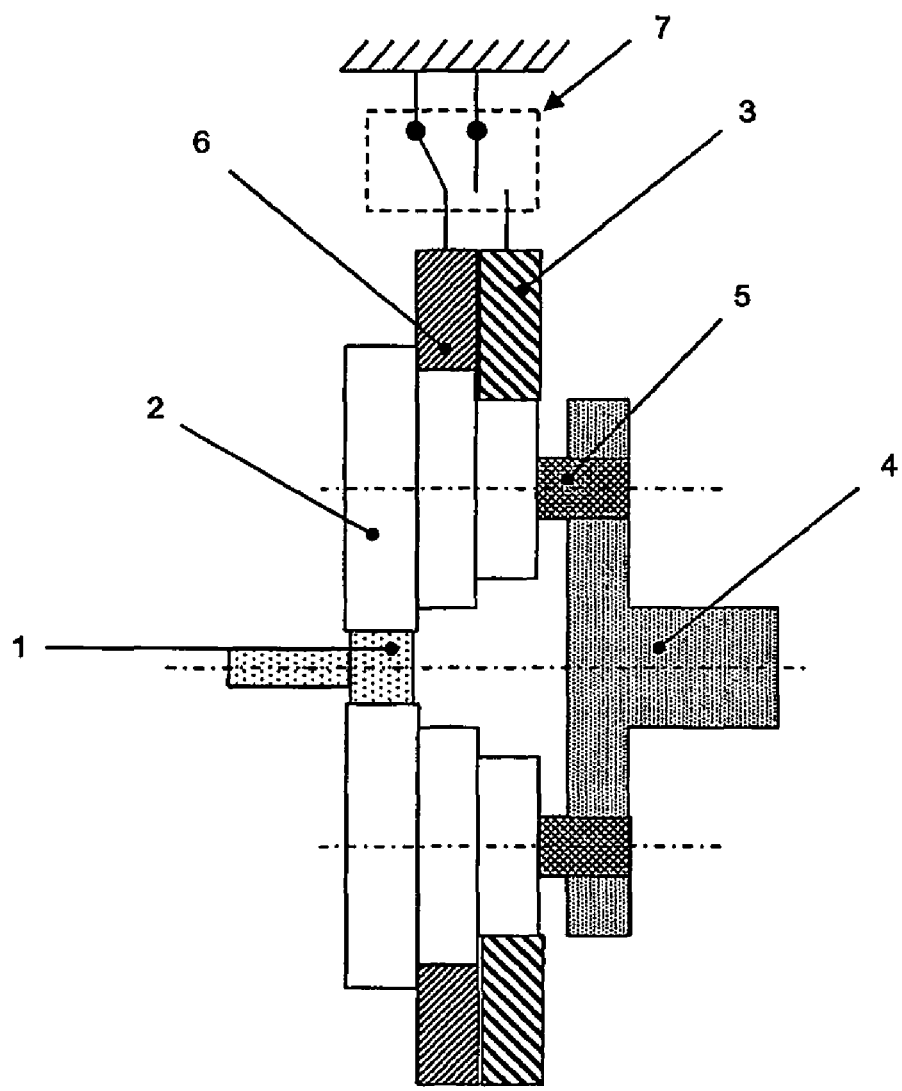
FIGS. 7, 7a and 7b illustrate transmissions where the number of planet wheels is equal to, or exceeds the number of annulus rings.

FIG. 7 shows an embodiment where the number of annulus rings 3 and 6 are two, but the segments on the planet wheels 2 exceeds the number of annulus rings by one or more. In FIG. 7 the planet wheels have one additional segment that is not interacting with any annulus ring, but is interacting only with the sun wheel 1. This embodiment allows making different kinds of interaction and e.g. a gear module of the interaction between the sun wheel/planet wheels, and the planet wheels/annulus rings.

Figure 7A:
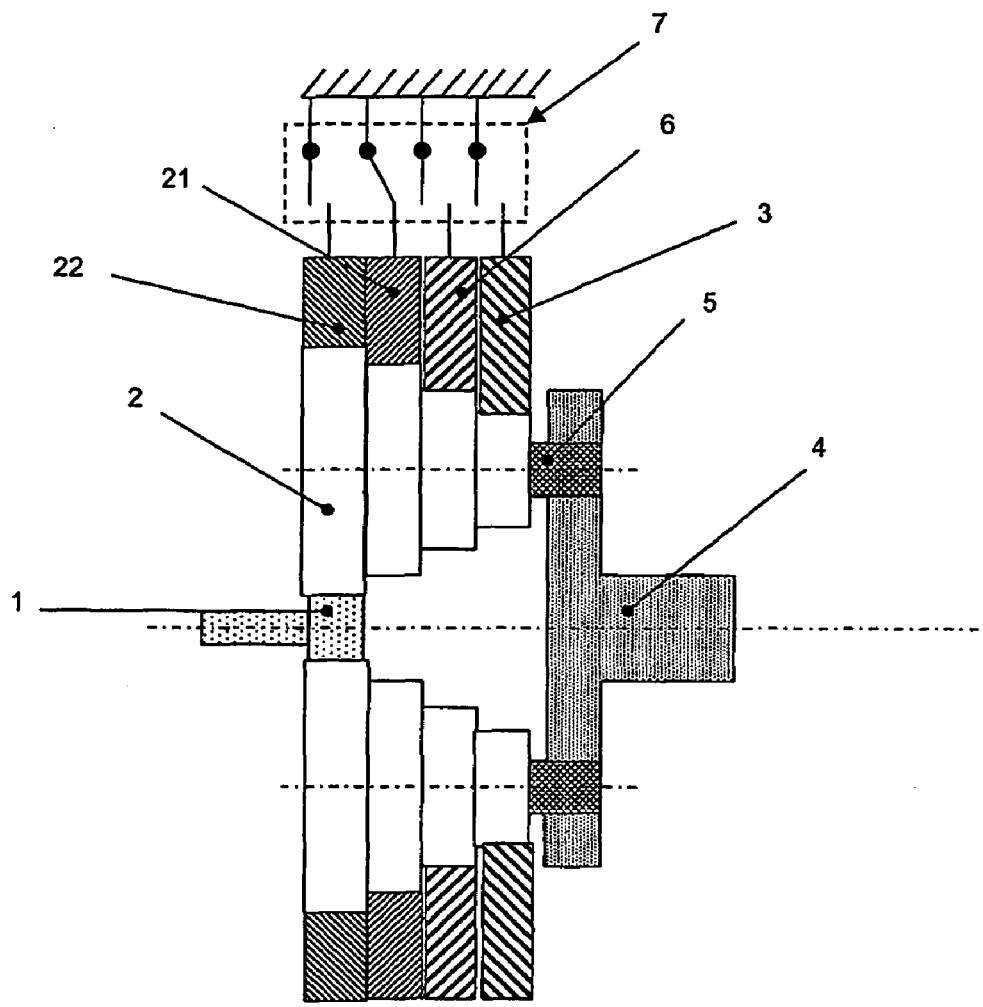

FIG. 7A shows an embodiment where the number of annulus rings is four as two extra annulus rings 21 and 22 are added. There is only one sun wheel 1. Each of the annulus rings may be locked or partially locked to the reference system.

Figure 7B:
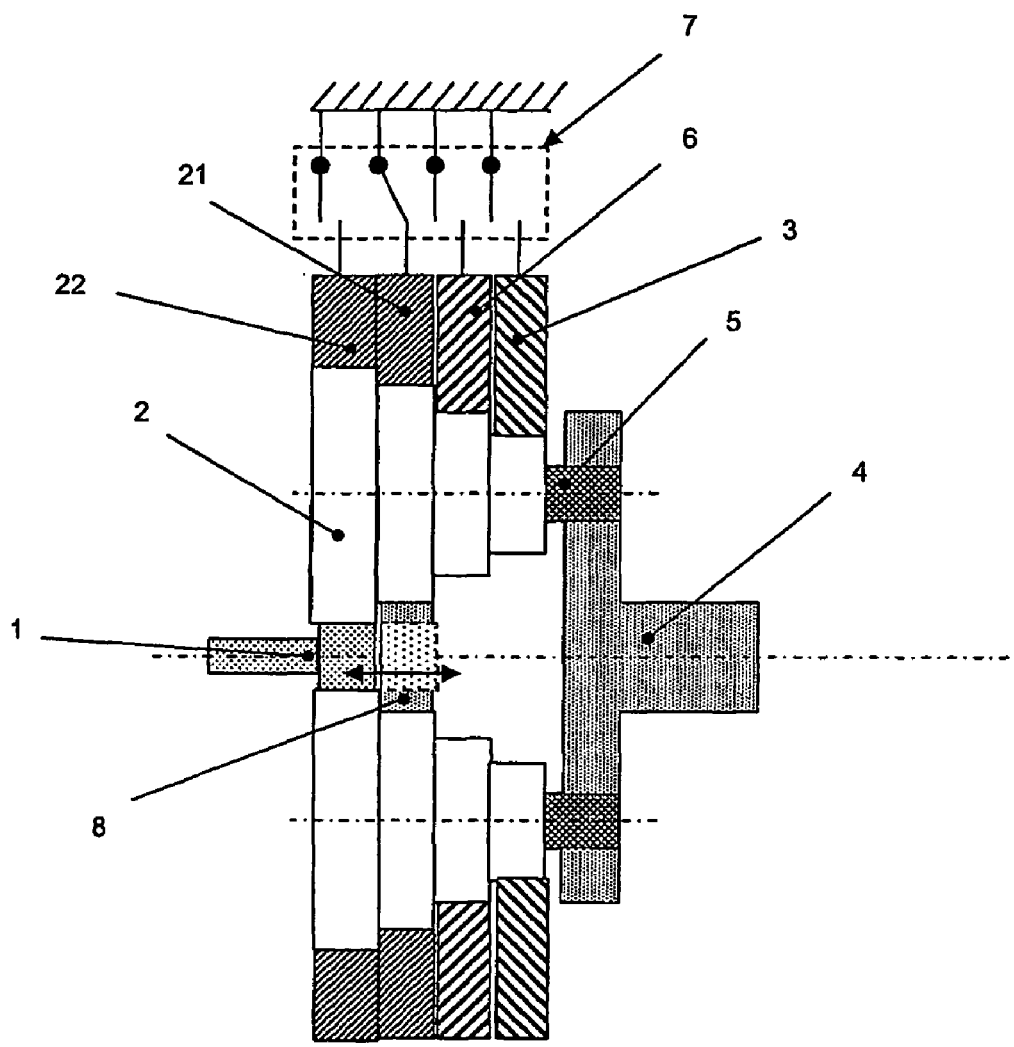

FIG. 7B shows the same transmission as in FIG. 7A with one additional sun wheel 8 that may be used to expand the number of gears, as there will be four gears in the embodiment shown in FIG. 7A, which may be doubled by adding this extra sun wheel. The extra sun wheel may be activated as the sun wheel 1 connected to the input shaft may slide out of interaction with the planet wheel and into a cutout of the extra sun wheel in order to transfer power through this sun wheel instead of directly to the planet wheels. More than two sun wheels may be applied to increase the number of gear ratios even more.

The invention claimed is:

1. A transmission providing a gear ratio between an input shaft and an output shaft, the transmission comprising:
   a first annulus ring;
   a second annulus ring;
   a first sun wheel being rotatable around a central axis of the transmission;
   a second sun wheel being rotatable around the central axis of the transmission;
   at least one planet carrier being rotatable around the central axis of the transmission;
   a set of planet wheels, each wheel of the set of planet wheels comprising a plurality of different wheel segments, the planet wheels being attached to the planet carrier via rotational bearings and arranged to rotate epicyclically around the central axis;
   a sun wheel selection means configured to selectively establish interaction between one of the sun wheels and one of the wheel segments; and
   annulus ring selection means for selectively at least partially locking one of the first and second annulus rings relative to a reference system;
   wherein one of the wheel segments is configured to interact with the first annulus ring, and
   another one of the wheel segments is configured to interact with the second annulus ring.

2. A transmission according to claim 1, wherein the first sun wheel is configured to interact with different wheel segments than the second sun wheel, when selected by the sun wheel selection means.

3. A transmission according to claim 1, comprising an annulus ring and a sun wheel which interact with the same wheel segment.

4. A transmission according to claim 1, comprising at least three annulus rings.

5. A transmission according to claim 1, wherein the locking forms a brake that prevents the output shaft from rotating.

6. The transmission according to claim 1, wherein the locking is enabled so that both annulus rings can be locked simultaneously followed by a release of one of the rings.

7. The transmission according to claim 1, wherein the input shaft rotates with the first sun wheel or the planet carrier, and the output shaft rotates with the other one of the first sun wheel and the planet carrier.

8. The transmission according to claim 1, wherein one of the wheel segments interacts with the first sun wheel and the first annulus ring, which is at least partially locked.

9. The transmission according to claim 1, wherein one of the wheel segments interacts with the first sun wheel and with the first annulus ring in two different ways.

10. The transmission according to claim 1, wherein at least two of the wheel segments comprise different materials.

11. The transmission according to claim 1, wherein
    each annulus ring forms a gear wheel with an internal toothing,
    the wheel segments form gear wheels with outer toothing and with different pitch circle diameters, and
    each sun wheel forms a gear wheel with outer toothing.

* * * * *